United States Patent
Stine et al.

(10) Patent No.: US 9,536,461 B2
(45) Date of Patent: Jan. 3, 2017

(54) METHOD AND SYSTEM FOR USE IN UPRENDERING MULTIMEDIA CONTENT

(71) Applicant: Sony Computer Entertainment Inc., Tokyo (JP)

(72) Inventors: Jacob P. Stine, La Honda, CA (US); Dmitri Tolstov, San Carlos, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 159 days.

(21) Appl. No.: 14/321,081

(22) Filed: Jul. 1, 2014

(65) Prior Publication Data

US 2016/0005344 A1    Jan. 7, 2016

(51) Int. Cl.
| | | |
|---|---|---|
| G06T 17/00 | (2006.01) | |
| G09G 3/00 | (2006.01) | |
| G09G 3/20 | (2006.01) | |
| G06T 15/00 | (2011.01) | |

(52) U.S. Cl.
CPC ............ *G09G 3/007* (2013.01); *G06T 15/005* (2013.01); *G09G 3/2085* (2013.01); *G09G 2320/10* (2013.01); *G09G 2340/0407* (2013.01); *G09G 2340/10* (2013.01)

(58) Field of Classification Search
None
See application file for complete search history.

(56) References Cited

U.S. PATENT DOCUMENTS

| | | |
|---|---|---|
| 5,532,751 A | 7/1996 | Lui |
| 6,295,089 B1 | 9/2001 | Hoang |
| 6,529,613 B1 | 3/2003 | Astle |
| 6,600,517 B1 | 7/2003 | He |
| 6,630,961 B1 | 10/2003 | Shin |

(Continued)

FOREIGN PATENT DOCUMENTS

| | | |
|---|---|---|
| JP | 4364685 | 12/1992 |
| JP | 11069144 | 3/1999 |

(Continued)

OTHER PUBLICATIONS

Brown et al., "Multi-scale Edge Detection and Feature Binding: An Integrated Approach", Pattern Recognition vol. 31, No. 10, pp. 1479-1490, 1998.

(Continued)

*Primary Examiner* — Peter Hoang
(74) *Attorney, Agent, or Firm* — Fitch, Even, Tabin & Flannery, LLP

(57) ABSTRACT

Some embodiments provide methods of increasing a resolution of multimedia content. Some of those methods comprising: identifying an uprendering matrix, wherein the uprendering matrix is dependent on a resulting resolution of resulting multimedia content having the increased resolution; and for each source image of the multimedia content: defining a reference image of the source image from the multimedia content, wherein the reference image has a resolution that is the same as an original resolution of the source image; defining multiple shifted images of the source image, wherein each of the multiple shifted images corresponds with one of the elements of the uprendering matrix; and coalescing pixels from each of the reference image and the shifted images creating an uprendered image having a higher resolution than the reference image.

17 Claims, 7 Drawing Sheets

(56) References Cited

U.S. PATENT DOCUMENTS

| | | | |
|---|---|---|---|
| 6,680,752 | B1 | 1/2004 | Callway |
| 7,023,487 | B1 | 4/2006 | Adams |
| 7,075,581 | B1 | 7/2006 | Ozgen |
| 7,450,136 | B1* | 11/2008 | Moreton ............... G06F 15/005 345/582 |
| 7,893,993 | B2 | 2/2011 | Winger |
| 8,319,892 | B2* | 11/2012 | Kageyama ............ G06T 3/4084 345/660 |
| 8,717,502 | B2 | 5/2014 | Suba |
| 9,215,403 | B2 | 12/2015 | SubaMiura |
| 2001/0008425 | A1 | 7/2001 | Shin |
| 2003/0076447 | A1 | 4/2003 | Wang |
| 2004/0135926 | A1 | 7/2004 | Song |
| 2004/0207753 | A1 | 10/2004 | Jung |
| 2004/0257475 | A1 | 12/2004 | Kim |
| 2005/0073607 | A1 | 4/2005 | Ji |
| 2005/0134730 | A1 | 6/2005 | Winger |
| 2005/0141785 | A1 | 6/2005 | Chao |
| 2005/0162548 | A1 | 7/2005 | Kang |
| 2005/0168633 | A1 | 8/2005 | Neuman |
| 2005/0276517 | A1* | 12/2005 | Collins ..................... G06T 3/40 382/300 |
| 2006/0039631 | A1 | 2/2006 | Chao |
| 2006/0110072 | A1 | 5/2006 | Domera-Venkata |
| 2007/0040946 | A1 | 2/2007 | Nagakura |
| 2007/0070244 | A1 | 3/2007 | Wyman |
| 2008/0231755 | A1 | 9/2008 | Suba |
| 2012/0188245 | A1* | 7/2012 | Hyatt ................. G02B 27/0172 345/428 |
| 2014/0232937 | A1 | 8/2014 | Suba |

FOREIGN PATENT DOCUMENTS

| | | |
|---|---|---|
| JP | 2000253238 | 9/2000 |
| JP | 2004032708 | 1/2004 |
| JP | 2004193747 | 7/2004 |
| JP | 2004215163 | 7/2004 |
| JP | 2004236012 | 8/2004 |
| JP | 2006054899 | 2/2006 |

OTHER PUBLICATIONS

European Patent Office; "Communication Pursuant to Article 94(3) EPC" issued in European Patent Application No. 08732365.5, dated Jan. 11, 2011, 5 pages.

European Patent Office; "Communication Pursuant to Article 94(3) EPC" issued in European Patent Application No. 08732365.5, dated May 21, 2010, 1 page.

European Patent Office; "Communication Pursuant to Article 94(3) EPC" issued in European Patent Application No. 09014671.3, dated Jan. 11, 2011, 5 pages.

European Patent Office; "Communication under rule 71(3) EPC" issued in European Patent Application No. 08732365.5, dated Nov. 10, 2011, 38 pages.

European Patent Office; "Decision to Refuse a European Patent Application" issued in European Patent Application No. 09014671.3, dated Jun. 14, 2012, 20 pages.

European Patent Office; "Extended European Search Report (including the Supplementary European Search Report and the European Search Opinion)" issued in European Patent Application No. 08732364.5, dated Feb. 25, 2010, 9 pages.

European Patent Office; "Extended European Search Report (including the Supplementary European Search Report and the European Search Opinion)" issued in European Patent Application No. 09014671.3, mailed Feb. 19, 2010, 10 pages.

European Patent Office; "Summons to attend oral proceedings pursuant to Rule 115(1) EPC" issued in European Patent Application No. 09014671.3, dated Nov. 2, 2011, 4 pages.

Japanese Patent Office; "Decision to Grant a Patent" issued in Japanese Patent Application No. 2009-554680, dated Dec. 11, 2012, 3 pages.

Japanese Patent Office; "Final Notification of Reasons for Refusal" issued in Japanese Patent Application No. 2009-554680, dated Sep. 18, 2012, 4 pages (includes English translation).

Japanese Patent Office; "Notification of Reasons for Refusal" issued in Japanese Patent Application No. 2009-554680, dated Jun. 26, 2012, 8 pages (includes English translation).

Patent Cooperation Treaty; "International Search Report" issued in PCT Application No. PCT/US08/57264, mailed Aug. 6, 2008, 2 pages.

Patent Cooperation Treaty; "Notification of Transmittal of the International Search Report and the Written Opinion of the International Searching Authority, or the Declaration" issued in PCT Application No. PCT/US08/57264, mailed Aug. 6, 2008, 2 pages.

Patent Cooperation Treaty; "Written Opinion of the International Searching Authority" issued in PCT Application No. PCT/US08/57264, mailed Aug. 6, 2008, 7 pages.

USPTO; Examiner-Initiated Interview Summary & Advisory Action issued in U.S. Appl. No. 14/264,884, mailed Jul. 21, 2015, 4 pages.

USPTO; Final Office Action issued in U.S. Appl. No. 11/725,901, mailed Feb. 2, 2011, 23 pages.

USPTO; Final Office Action issued in U.S. Appl. No. 11/725,901, mailed Sep. 13, 2012, 17 pages.

USPTO; Final Office Action issued in U.S. Appl. No. 14/264,884, mailed Apr. 21, 2015, 6 pages.

USPTO; Interview Summary issued in U.S. Appl. No. 11/725,901, mailed Mar. 1, 2011, 4 pages.

USPTO; Interview Summary issued in U.S. Appl. No. 11/725,901, mailed Sep. 13, 2010, 4 pages.

USPTO; Notice of Allowance issued in U.S. Appl. No. 11/725,901, mailed Dec. 24, 2013, 9 pages.

USPTO; Notice of Allowance issued in U.S. Appl. No. 14/264,884, mailed Aug. 7, 2015, 6 pages.

USPTO; Office Action issued in U.S. Appl. No. 11/725,901, mailed Aug. 3, 2010, 19 pages.

USPTO; Office Action issued in U.S. Appl. No. 11/725,901, mailed Aug. 6, 2013, 17 pages.

USPTO; Office Action issued in U.S. Appl. No. 11/725,901, mailed Dec. 13, 2011, 19 pages.

USPTO; Office Action issued in U.S. Appl. No. 11/725,901, mailed Mar. 15, 2010, 15 pages.

USPTO; Office Action issued in U.S. Appl. No. 14/264,884, mailed Nov. 20, 2014, 9 pages.

\* cited by examiner

METHOD AND SYSTEM FOR USE IN UPRENDERING MULTIMEDIA CONTENT

BACKGROUND

1. Field of the Invention

The present invention relates generally to multimedia content, and more specifically to rendering multimedia content.

2. Discussion of the Related Art

Large amounts of multimedia content were generated with display resolutions that are relatively low compared to current displays. Similarly, many multimedia sources are configured to generate content with resolutions that are relatively low compared to current displays.

SUMMARY OF THE INVENTION

Some embodiments provide methods of increasing a resolution of multimedia content, comprising: identifying an uprendering matrix, wherein the uprendering matrix is dependent on a resulting resolution of resulting multimedia content having the increased resolution; and for each source image of the multimedia content: defining a reference image of the source image from the multimedia content, wherein the reference image has a resolution that is the same as an original resolution of the source image from the multimedia content; defining multiple shifted images of the source image from the multimedia content, wherein each of the multiple shifted images corresponds with one of the elements of the uprendering matrix, and wherein each pixel in each of the multiple shifted images is shifted proportional to the element in the uprendering matrix with which the shifted image corresponds; and coalescing pixels from each of the reference image and the shifted images creating an uprendered image having a higher resolution than the reference image.

Further, some embodiments provide methods of generating a progressive scan signal of multimedia content, comprising: accessing an interlaced signal comprising pairs of source even and odd images, with each source even image and each source odd image specifying a matrix of pixels; for each pair of source even and odd images: defining, for the source even image, a reference even image having a resolution that is the same as the resolution of the source even image and at least one shifted even image with each pixel of the at least one shifted even image being shifted relative to a position of a corresponding pixel of the reference even image; coalescing the reference even image and the at least one shifted even image defining an upconverted first image having a resolution greater than the resolution of the source even image; defining, for the source odd image, a reference odd image having a resolution that is the same as the resolution of the source odd image and at least one shifted odd image with each pixel of the shifted odd image being shifted relative to a position of a corresponding pixel of the reference odd image; and coalescing the reference odd image and the at least one shifted odd image defining an upconverted second image having a resolution greater than the resolution of the source odd image; defining a progressive scan signal configured to sequentially playback the upconverted first image and the upconverted second image defined from each pair of the source even and odd images.

Some embodiments provide apparatuses comprising: a control circuit; and a memory coupled to the control circuit and storing computer instructions that when executed by the control circuit perform the follows steps: identify an uprendering matrix, wherein the uprendering matrix is dependent on a resulting resolution of resulting multimedia content having the increased resolution; and for each source image of the multimedia content: define a reference image of the source image from the multimedia content, wherein the reference image has a resolution that is the same as an original resolution of the source image from the multimedia content; define multiple shifted images of the source image from the multimedia content, wherein each of the multiple shifted images corresponds with one of the elements of the uprendering matrix, and wherein each pixel in each of the multiple shifted images is shifted proportional to the element in the uprendering matrix with which the shifted image corresponds; and coalesce pixels from each of the reference image and the shifted images creating an uprendered image having a higher resolution than the reference image.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
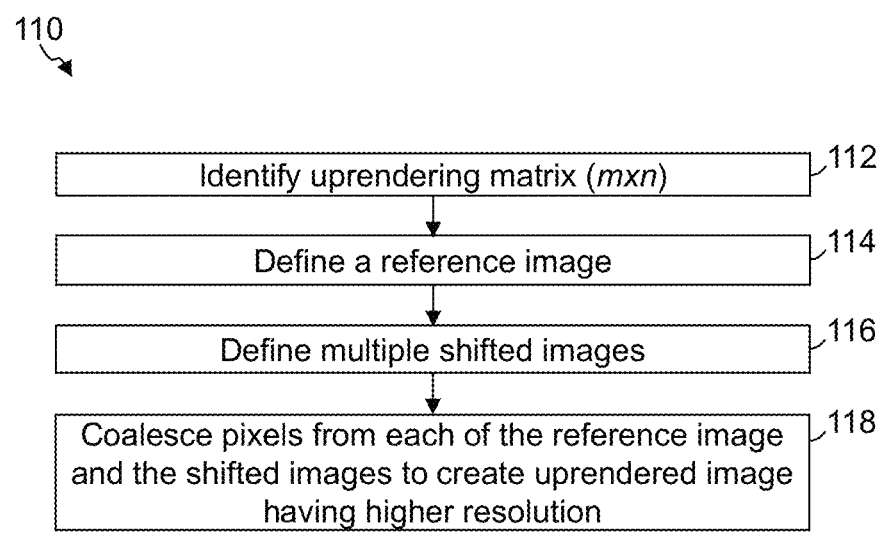
FIG. 1 shows a simplified flow diagram of an exemplary process of uprendering multimedia content, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In many instances, multimedia content is configured to be played back in accordance with a fixed resolution and/or at a fixed frame rate. Further, many legacy multimedia content are configured to be played back through interlaced fames where a frame is displayed through two fields or images with a first image corresponding to even rows of pixels of the frame and the second image corresponding to odd rows of the frame. Such rendering, however, does not take advantage of more recent displays and televisions, such as many plasma and LCD displays and televisions. Some embodiments, however, are configured to provide uprendering of such source multimedia content to increase the resolution of frames of the multimedia content.

FIG. 1 shows a simplified flow diagram of an exemplary process 110 of uprendering multimedia content, in accordance with some embodiments. In step 112, an uprendering matrix is identified. The uprendering matrix dictates a resolution of the resulting uprendered frames of the uprendered multimedia content. The uprendering matrix can provide substantially any relevant matrix. In some implementations, the uprendering matrix provides a 2×2 matrix, a 2×4 matrix, a 4×2 matrix, a 4×4 matrix, or substantially any relevant M×N matrix. It is noted that the uprendering can be applied to frames as well as to images or fields of interlaced content. The below will generally be described regarding the uprendering of images, however, it will be appreciated that the uprendering can be applied to frames, interlaced images, fields and the like as well.

In step 114, a reference image is defined for each source image of the source multimedia content being uprendered. In many embodiments, the reference image is substantially equivalent to the source image being uprendered, and accordingly has a resolution that is substantially identical to the source image being uprendered. For example, when uprendering a source image having a resolution of [640×448], the reference image similarly has the resolution of [640×448]. In step 116, multiple shifted images are defined from the source image and in accordance with the uprendering matrix. In some embodiments, each of the multiple shifted images corresponds with one of the elements of the uprendering matrix. The shifted images are copies of the source image having a resolution that is the same as the source image. The pixels in each shifted image are also consistent with the pixels of the source image but are shifted from the source image in the X/Y and U/V sampling.

In some embodiments, the X/Y are coordinates describing a target (e.g., a display), while the U/V are sampling coordinates describing a source (e.g., texture). Data is typically taken from the U/V and drawn at a corresponding X/Y. Further, in some implementations, when performing an uprendering the X/Y and U/V are scaled in unison within a single coordinate space. Additionally, some embodiments are implemented such that UV samples occur at predictable intervals within each coordinate space so that UV bounds checking can be applied situationally, and/or to specific cells within the uprender matrix.

For example, when the uprendering matrix is a 2×2 matrix, a reference image (RI) is defined in step 114, and three shifted images (SI1-SI3) are defined:

RI: [640×448] SI1: [640×448]
SI2: [640×448] SI3: [640×448].

In some embodiments, the amount of shift implemented for each shifted image is a multiple of a half pixel shift and proportional to an element of uprendering matrix with which the shifted image corresponds.

As one example, when the uprendering matrix selected in step 112 is a 2×2 matrix, with a source image having a resolution of [640×448], a reference image (RI) is generated consistent with the source image, having the [640×448] resolution. Based on the 2×2 uprendering matrix, three additional shifted images are defined, also with [640×448] resolution where the pixels in each of the shifted images are shifted. In accordance with some embodiments, when the pixel shift is a multiple of half a pixel shift, a first shifted image (SI1) is defined with a pixel shift in the X direction by half a pixel (i.e., X/U +0.5 shift), a second shifted image (SI2) is defined with a pixel shift in the Y direction by half a pixel (i.e., Y/V +0.5 shift), and a third shifted image (SI3) is defined with a half pixel shift in each the X and Y directions (i.e., XY/UV +0.5 shift) in accordance with the 2×2 matrix. As such, the pixel shift can, in this example, be defined as follows:

RI: (no shift) SI1: (X/U=+0.5)
SI2: (Y/V=+0.5) SI3: (XY/UV=+0.5).

In step 118, the pixels from each of the reference image and the shifted images are coalesced in accordance with each pixel location and their association with one of the elements of the uprendering matrix creating an uprendered image that has a higher resolution in accordance with the uprendering matrix and is higher than the reference image. Accordingly, a pixel at a first row and first column of the reference image is defined at the pixel at the first row and first column of the resulting uprendered image with the pixel at the first row and first column of each of the shifted images being defined as pixels adjacent the pixel at the first row and first column in accordance with the element of the uprendering matrix with which the shifted image is associated. Subsequent pixels are similarly coalesced to define the uprendered image having the increased resolution in accordance with the uprendering matrix. In some embodiments, the uprendered image can be used as an input for optional additional post processing steps (e.g., upscaling, and the like), and provided as final input to either display/video encoder or output to display device.

Figure 2:
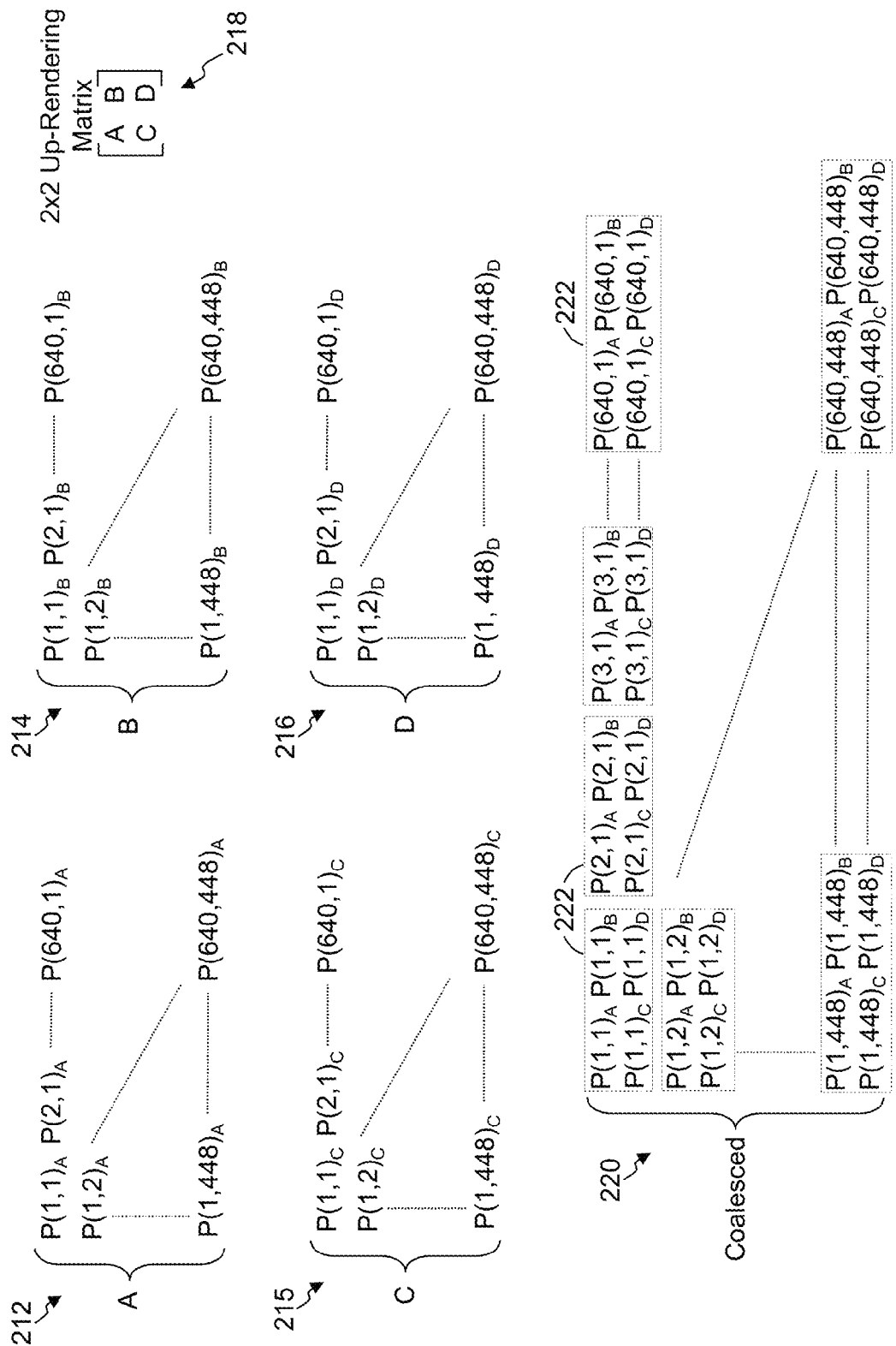
FIG. 2 shows a simplified exemplary representation of coalescing pixels from a reference image (A) and three shifted images (B, C and D) defined based on a 2×2 uprendering matrix defining a coalesced uprendered image, in accordance with some embodiments.

FIG. 2 shows a simplified exemplary representation of the coalescing of pixels from a reference image (A) 212 and three shifted images (B, C and D) 214-216 defined based on a 2×2 uprendering matrix 218 defining a coalesced uprendered image 220, in accordance with some embodiments. Again, in some implementations, the reference image (A) 212 is substantially identical to the source image having, in this example, a resolution of [640×448], with each pixel positioned according to row and column. The first shifted image (B) corresponds to the element (1,2) of the uprendering matrix with the pixels of the first shifted image (B) being shifted a half pixel in the X direction. Similarly, the second and third shifted images (C and D, respectively) correspond to the elements (2,1) and (2,2), respectively, of the uprendering matrix with the pixels of the second shifted image (C) being shifted a half pixel in the Y direction and the pixels of the third shifted image (D) being shifted a half pixel in both the X and Y directions. In some embodiments, the pixel data of the reference image and the shifted images are stored in a single memory, buffer or the like, while in other embodiments multiple buffers are utilized. For example, in some embodiments, a separate buffer is specified and utilized for each of the reference image and the shifted images (e.g., in the example of FIG. 2, four buffers are utilizes, a first buffer for the reference image 212 and separate buffers for each of the three shifted images 214-216).

In coalescing the reference image 212 and the shifted images 214-216 similarly positioned pixels from reference image and the shifted images together according to the uprendering matrix. Again, in this example, the uprendering matrix is a 2×2 matrix defined by elements. As such, pixels and/or pixel data of the first row and first column (i.e., position (1,1)) from each of the reference image and the shifted images are grouped in the uprendered image as a first pixel grouping 222 with the pixels from the shifted images being defined as positioned relative to the reference image of the pixel grouping in accordance with the element of the uprendering matrix with which they are associated. Subsequent pixel groupings are defined for each pixel of the reference image and the corresponding pixels from the shifted images. The resulting uprendered image 220 is defined to include the increased numbers of pixels in accordance with the uprendering matrix. In the example of FIG. 2, the resulting uprendered image 220 results in twice the resolution of the source image based on the 2×2 uprendering matrix (i.e., a resolution in this example of [1280×896]).

Figure 3:
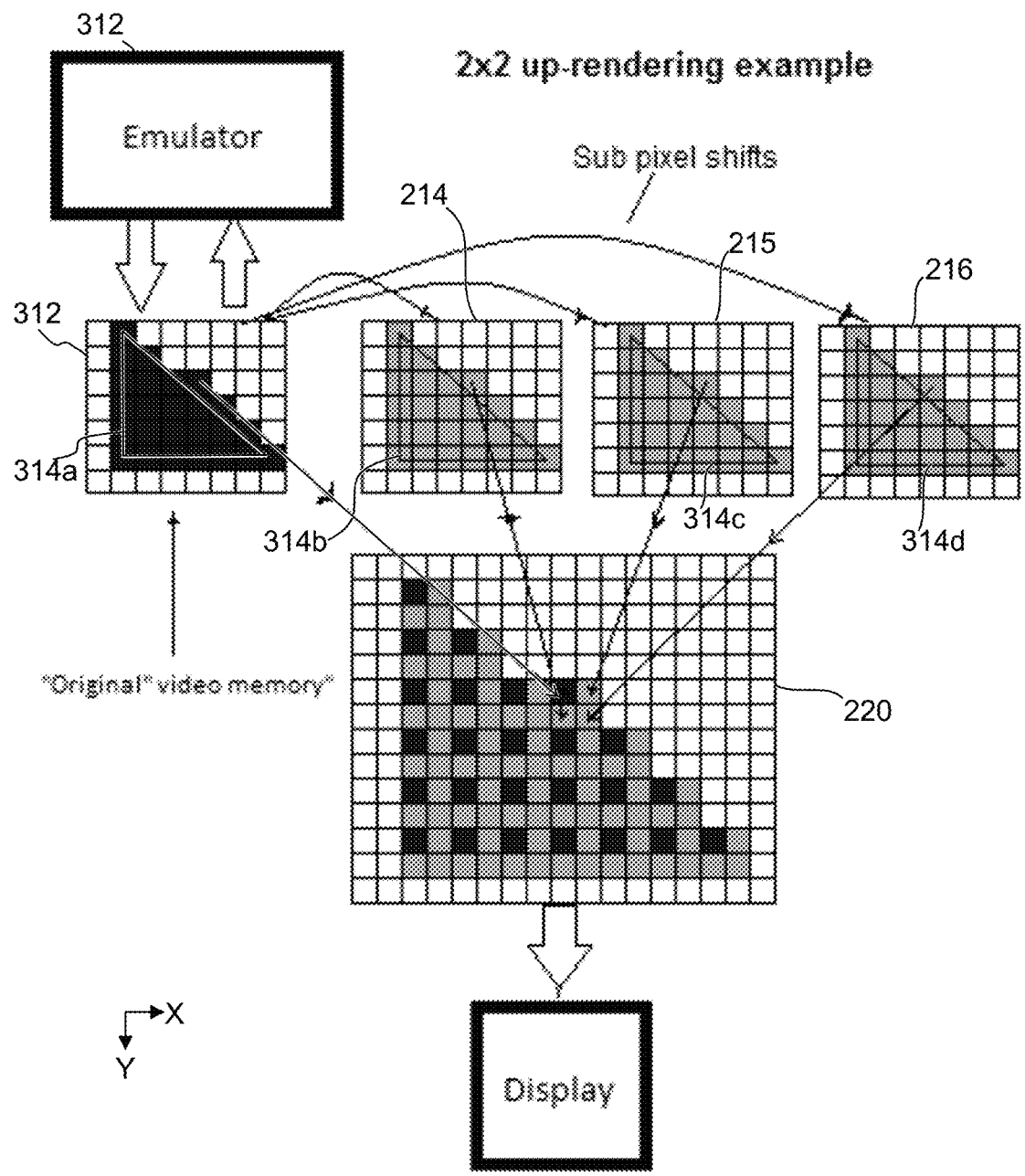
FIG. 3 shows a simplified pictorial representation corresponding to defining a portion of a reference image and the corresponding three shifted images, and the coalescing of the reference and shifted images to define a corresponding portion of the uprendered image, in accordance with some embodiments.

FIG. 3 shows a simplified pictorial representation corresponding to defining a portion of a reference image 212 and the corresponding three shifted images 214-216, and the coalescing of the reference and shifted images to define a corresponding portion of the uprendered image 220, in accordance with some embodiments. The original source content is accessed through, for example, an emulator 312 and a reference image 212 is defined, which in many embodiments is the same as the source image. The portion of the reference image 212 shows a polygon 314a and a series of pixels corresponding to the polygon. The shifted images each also define the polygon 314b-d and pixels corresponding to the respective polygons. Again, however, the shifted images are defined such that the pixels are shifted by a multiple of a half pixel in accordance with the uprendering matrix.

The uprendered image 220 is defined grouping pixel data having a same pixel location from each of the reference image (e.g., from a first buffer corresponding to the reference image) and the one or more shifted images (e.g., from different buffers corresponding to the shifted images). For example, the uprendered image is defined by grouping corresponding pixels into the pixel groupings 222 of four pixels, one from each of the reference image 212 and the three shifted images 214-216. Again, for each pixel grouping the pixels from the shifted images are positioned relative to the pixel from the reference image in accordance with the element of the uprendering matrix. The portion of the resulting uprendered image 220 shows the polygon with an increased resolution (in this example, the uprendering matrix defines a 2×2 matrix, and produces an uprendered image at twice the resolution of the source image). Once defined, the uprendered image 220 can then be directed to a display 314, memory for storage, communicated over network (local area network (LAN), wide area network (WAN), the Internet, etc.), otherwise uses, combination of such uses, and/or can be still further processed (e.g., additional post processing) before being displayed, encoded, saved, and/or other image processing may be performed.

In some embodiment, the uprendering achieves a higher resolution uprendered image. This uprendering can be applied to substantially any image to generate a higher resolution image, frame or the like. For example, the uprendering can be applied to legacy interactive electronic games, video content, digital photographs, and/or other such images. In some instances, the uprendering is applied to legacy PlayStation® electronic games that often generate frames having a resolution of [640×448]. Accordingly, the uprendering can be applied to increase the resolution of frames as the game is being played back to generate higher resolution images that can take advantage of displays and televisions with greater resolution and/or increased size that were available at the time the gaming titles were originally generated. As such, the uprendering allows images of PlayStation legacy gaming titles to be uprendered and displayed with higher definition graphics while still maintaining a correct emulation model of the original legacy hardware on which the titles were based. Additionally, in some embodiments, the uprendering through the cooperation of the reference image and the shifted images can retain the deterministic method of point-sampling that some image systems and/or legacy titles utilize to render correctly. Further, the uprendering provided through the coalescing of the reference image and the one or more shifted images often minimizes the introduction of artifacts, which are common to other methods of uprendering.

Additionally, the use of the reference image and the one or more shifted images improves memory usage and/or access. Typically, video memory addressing is not linear. Instead, it is often organized in pages and blocks. Trivially increasing the size of the video memory buffer will typically change the expected memory layout and may require that all addresses in the video memory be recalculated on the fly, which can be a time consuming task. Instead, some embodiments preserve the original memory layout by defining the reference image, which allows the polygon data (e.g., triangle data) to be preserved and/or untouched. Further, some embodiments to not scale the memory or buffer, but instead use a number of buffers of the original size and corresponding to the uprendering matrix (e.g., four buffers when applying a 2×2 matrix, which corresponds to the reference image buffer and three shifted image buffers). In some implementations, the shifted image data is put into the additional buffers during rasterization stage. Each sub-buffer or shifted image buffer corresponds to a corresponding sub-pixel shift. When coalescing the reference image and the shifted images, pixel data is assembled to the uprendered output image from each of the buffers in accordance with the uprendering matrix to provide the pixel groupings 222. Further, the use of multiple buffers or sub-buffers provides a modularity to the memory and/or uprendering system. The modularity readily allows the addition of more buffers, or to toggle between up-rendered and regular playback modes.

In some embodiments, the defining of the multiple shifted images includes further processing relative to texture sampling, boundary conditions and/or other such processing. As is common in many rendering techniques, texture sampling is defined and implemented to obtain relevant texture data used in defining the pixel illumination and coloring. In many implementations of image processing and/or the pixel display of images, the images are divided into one or more polygons (e.g., triangles) and texture and/or color mapping is defined relative to the polygons and/or vertices of the polygons. As such, the pixel shifting implemented in defining the shifted images may result in pixels defined beyond one or more boundaries of a corresponding polygon. According, some embodiments perform texture boundary checks relative to at least the shifted pixels, in some instances at least those pixels corresponding to polygon boundaries, and often preforms a boundary check for every pixel shifted in each of the shifted images.

Figure 4:
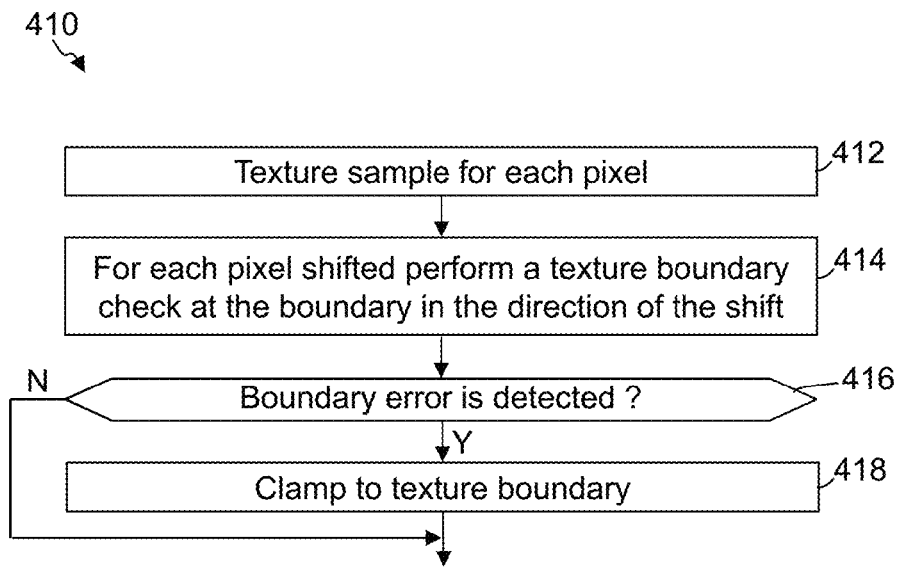
FIG. 4 shows a simplified flow diagram of a process that can be used in defining at least the shifted images, in accordance with some embodiments.

FIG. 4 shows a simplified flow diagram of a process 410 that can be used in defining at least the shifted images 214-216, in accordance with some embodiments. In some implementations, the process 410 is implemented as part of defining the shifted images in step 116 of FIG. 1, while in other implementations the process 410 is an independent process. In step 412, texture sampling is performed for each pixel of the reference image and the shifted images. In step 414, texture boundary or edge checking is performed for each shifted pixel of the shifted images. For example, in some embodiments pixels are identified that extend beyond a corresponding texture boundary as a result of the shifting of the pixels. In some embodiments, the texture boundary check is limited based on the known direction or directions of the pixel shift. For example, in some embodiments, the texture boundary or edge check may be limited to those pixels defined relative to a boundary and in a direction of the shift. As a specific example, if the shifted image is based on a half pixel shift to the right, the boundary check may be limited to those pixels corresponding to a boundary on the right, and similarly pixels shifted down would be known and the boundary check limited to those pixels corresponding to lower or bottom boundaries of the corresponding polygon.

In step 416, it is determined whether a boundary error is detected for a pixel. When a boundary error occurs the process, in some embodiments, advances to step 418 to perform, for each of the identified shifted pixels extending beyond the corresponding texture boundary, boundary clamping of one or more texture samples to the texture boundary corresponding to the shifted pixel. For example, in some implementation the clamping restricts or otherwise moves the texture mapping that extends beyond the boundary to a nearest available value on or within the boundary. Improved image quality and efficiency is achieved by applying the boundary checking to the shifted images.

The uprendering produces images and/or frames at higher definition and/or at increased resolutions over the source images or frames. Further, the uprendering at least in part enables sub-pixel-accurate adjustments to an uprendered image while retaining an accurate model of the original legacy application rendering process. Further, some embodiments retain the deterministic method of point-sampling that many legacy titles employ in order to be rendered correctly. Combination of multiple rendered images with sub-pixel offsets and the coalescing of these images results in a single higher-resolution uprendered result. The reference image, which in many embodiments is effectively the original non-adjusted image, is generated as a non-redundant step of the uprendering process, and can be used as source data for functions of the legacy application that may expect original image data (e.g., reading back pre-processed image and/or texture data, and the like), and/or may be used in generating improved post-processing effects (e.g., a motion vector upscaler, edge smoothing, etc.). Additionally, in some embodiments, the uprendering retains the original (legacy) render target size and vector scale, while altering fixed-point sampling offsets. One of the advantages of this approach is that it retains the deterministic method of point-sampling that some legacy titles utilize in order to be rendered correctly.

Further, some embodiments utilize the uprendering in performing progressive upconversion to convert interlaced multimedia signals into a progressive output signal. As is known in the art, interlaced content and/or titles typically render a frame as two half-resolution fields or images per 30 Hz frame. For example, many legacy computer electronic games were developed to be displayed on cathode ray tube (CRT) televisions and accordingly produce frames by displaying an even image (i.e., an image that displays the even rows of pixels of a frame) and subsequently displaying an odd image (i.e., an image that displays the odd rows of pixels of the same frame). Moreover, at least some interlaced legacy titles often use a half-pixel shift between images or fields of a frame, for example, to reduce the amount of jitter perceived by the user. Accordingly, a [640×448] resolution frame is displayed as an even image that includes the even rows of the frame, and an odd image that includes the odd rows of the frame (which in some instances includes a half pixel shift, often in the Y direction). For example, a [640× 448] resolution frame may be represented as:

[640×224 (Even)] y=0.0 (i.e., no shift); \Interleaved as [640×448]

[640×224 (Odd)] y=0.5 (i.e., ½ pixel shift); /(deinterlace approximation).

Figure 5:
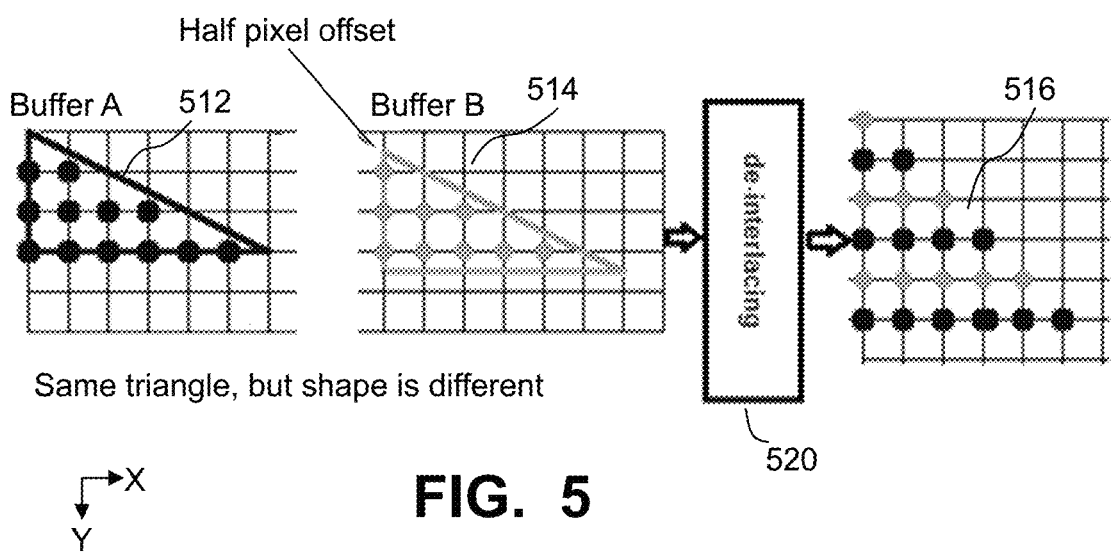
FIG. 5 shows a simplified block diagram of an exemplary representation of pixels of a polygon of an even image and corresponding pixels of an odd image that when sequentially displayed appear to a viewer as a single resulting triangle.

FIG. 5 shows a simplified block diagram of an exemplary representation of pixels of a polygon 512 (in this example a triangle) of an even image and corresponding pixels of the triangle of an odd image 514 that when sequentially displayed appear to a viewer as a single resulting triangle 516 (or when de-interlaced displays as the single polygon). Again, in many interlaced content the pixels of the odd image are shifted vertically (i.e., the triangle 514 of the odd image is shifted vertically in the Y), and in many instances the best results in the interlaced content are achieved when the shift is equal to a half pixel down (i.e., a half pixel shift in the +Y direction).

Since neither the even image nor the odd image provides a full set of image data, the deinterlacing of these two images are, in many previous systems, merged together in order to provide a full resolution frame. It is noted, however, that because the even and odd images are not offset by a full pixel, they share some amount of common data between them, and are not indicative of a true [640×448] resolution image or frame. Further, in order to display a correct full resolution image correctly (e.g., on higher resolution digital displays) some previous systems employed emulators that used complex de-interlacing algorithms.

Again, the even image 512 and the odd image 514 in the buffer are not identical as shown in FIG. 5. The even triangle 512 and the odd triangle 514 represent different parts of the same object. As described above, this happens because vertexes in the odd image 514 are half pixel shifted vertically down in the +Y direction. Many legacy de-interlacing systems 520 try to generate a bigger image with better quality by combining the two smaller but slightly different even and odd images together. Differences are typically more apparent when the image is not still (e.g., variations between the even image 512 and the odd image 514 as a result of motion that occurs between the displaying of source even image and displaying the source odd image). Accordingly, in order to avoid "combing artifacts" many systems apply at least blending for at least every second line.

Some present embodiments, however, preform an upconversion that does not combine the even image and the odd image and instead generates distinct higher resolution images from each of the even image and odd image resulting in at least two full resolution images or frames for each interlaced frame (i.e., interlaced half resolution even image and odd image). Still further, some embodiments provide both uprendering and upconversion to produce a progressive scan output.

Figure 6:
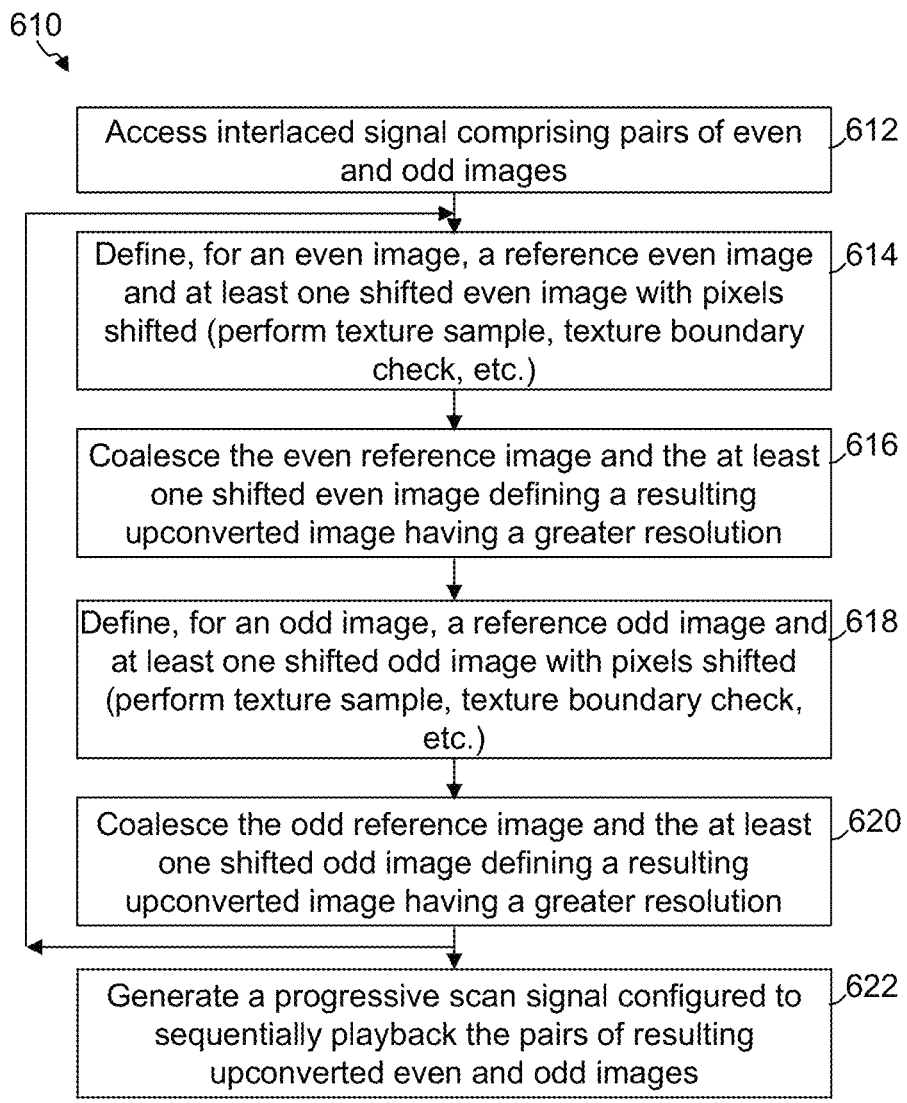
FIG. 6 shows a simplified flow diagram of an exemplary process of upconverting interlacing images and/or frames of multimedia content and defining or generating a progressive scan signal of multimedia content, in accordance with some embodiments.

FIG. 6 shows a simplified flow diagram of an exemplary process 610 of upconverting interlacing images and/or frames of multimedia content and defining or generating a progressive scan signal of multimedia content, in accordance with some embodiments. Some embodiments apply at least part of the uprendering in defining and/or generating higher resolution images when upconverting each of the interlaced even and odd images of the multimedia content. In step 612, a source interlaced signal is accessed. Again, many interlaced signals comprise pairs of source even and odd images, with each even image and each odd image specifying a matrix of pixels. Further, the source even image of the pair typically corresponds with and renders the even rows of a frame while the source odd image of the pair typically corresponds with and renders the odd rows of the same frame.

In some embodiments, step 614-620 are performed for each pair of source even and odd images, and continues to be repeated until the upconversion for the portion of the source content that is to be upconverted is complete. In step 614, a reference even image and at least one shifted even image are defined for each source even image being upconverted. Similar to the uprendering, the reference even image has a resolution that is the same as the resolution of the source even image, and in many embodiments is substantially identical to the source even image. The one or more shifted even images are defined with each pixel of the shifted even images being shifted relative to a position of a corresponding pixel of the reference even image. Typically, at least one of the shifted even images is defined with a full pixel shift in the +Y direction (i.e., vertically relative to the pixel matrix) to define an additional row of pixels, which at least in part compensates for the odd rows not included in the source even image.

Additionally or alternatively, in some embodiments the amount of pixel shift is a multiple of a half pixel, and particularly when an uprendering is performed in cooperation with the upconversion as further described above and below. Further, the shift can be dependent on an uprendering matrix being applied in performing the upconversion. As with the uprendering described above, the upconversion can define an uprendering matrix that is applied when defining the reference even image and the shifted even images. Again, the uprendering matrix can be substantially any matrix (e.g., 1×2, 2×4, 4×8, and/or other such matrices). In many embodiments, because the upconversion is defining an additional row of pixels (e.g., defining the odd rows that are missing from the even images), the uprendering matrix specifies twice as many row elements as column elements.

Additionally, in some embodiments, texture sampling is performed for each pixel in defining the reference even image and the one or more shifted even images. As described above, some embodiments further evaluate texture boundaries and/or perform texture boundary checking for pixels in at least the shifted even images. Again, some embodiments limit the boundary checking to those pixels proximate a boundary in the direction of the pixel shift. For example, in some embodiments, steps 412-418 are performed for the reference even image and the one or more shifted even images. In some embodiments, additional processing may be performed on the reference even image and/or the one or more shifted even images.

In step 616, the reference even image and the at least one shifted even image are coalesced to define a resulting upconverted first image or frame having a resolution that is greater than the resolution of the source even image. The coalescing includes cooperating the pixels from each of the reference even image and the one or more shifted even images in accordance with each pixel location and their association with one of the elements of the uprendering matrix defining the upconverted first image. Again, the pixel data of the uprendered image are defined based on the grouping of pixel data for pixels having a same pixel location from each of the reference image (e.g., from a first buffer corresponding to the reference even image) and the one or more shifted even images (e.g., from multiple different buffers each corresponding to one of the shifted even images)

In step 618, a reference odd image and at least one shifted odd image are defined for each source odd image being upconverted. As with the reference even image, the reference odd image has a resolution that is the same as the resolution of the source odd image. Further, in many interlaced content, when the odd image or field is generated for the interlaced content, a pixel shift is often applied to compensate for potential changes between the display of the even image and the odd image. In many instances, this interlaced pixel shift in the odd image is a half pixel shift down (positive Y direction). Accordingly, in some embodiments, the reference odd image is defined to include a shift of the pixels to compensate for the previously implemented interlaced half pixel shift down by applying a negative Y shift (i.e., shifting up) by half a pixel. Similarly, in generating the one or more shifted odd images, at least one of the shifted odd images is defined to compensate for the missing even rows with a shift down (a positive Y shift) from the source odd image by a half pixel achieving a difference of a full pixel shift between the reference odd image and the shifted odd image. One or more additional shifted odd images may further be defined based on the uprendering matrix, and in some embodiments, the amount of shift applied relative to the pixels in the reference odd images are a multiple of a half pixel. Further, texture sampling is performed for each pixel of the reference odd image and the one or more shifted odd images, and when relevant texture boundary checking is performed for pixels in at least the shifted odd images, and in some instances all of the pixels of the shifted odd images. In some embodiments, additional processing may be performed on one or both of the reference odd image and the one or more shifted odd images.

In step 620, the reference odd image and the at least one shifted odd image are coalesced to define a resulting upconverted image or frame having a resolution that is greater than the resolution of the source odd image. Again, the coalescing includes cooperating the pixels from each of the reference odd image and the shifted odd images in accordance with each pixel location and their association with one of the elements of the uprendering matrix defining the upconverted image.

Again, steps 614-620 may be repeated for each pixel pair of the interlaced source content. In step 622, a progressive scan signal is defined that is configured to provide sequential playback of the upconverted images defined from each pair of the source even image and the source odd image. By employing the upconversion, many embodiments in generating the progressive scan signal prevent combining the source even image and the source odd image, and further prevent or avoid the coalescing of the source or reference even image with the source or reference odd image.

In many previous deinterlacing processes, the source even image and the source odd image of each pair of even and odd images are combined to produce a full frame that includes pixels for both the even and odd lines. These deinterlacing processes typically also involve some combination of approximation through, for example, blur and blend processing in order to suppress motion that has occurred between the source even and source odd images. Often this reduces both effective frame rate and resolution of the generated resulting image or frame.

Further, in at least some present embodiments the deinterlacing can be skipped completely. This is possible because, in part, the upconversion generates separate images for each of the source even and odd images. Further, compensation is provided for the previous interlaced half pixel shift between the even image and the odd image. The upconverted first image from the source even image and upconvereted second image from the source odd image in both buffers are complete with full resolution or with a greater resolution.

Figure 7:
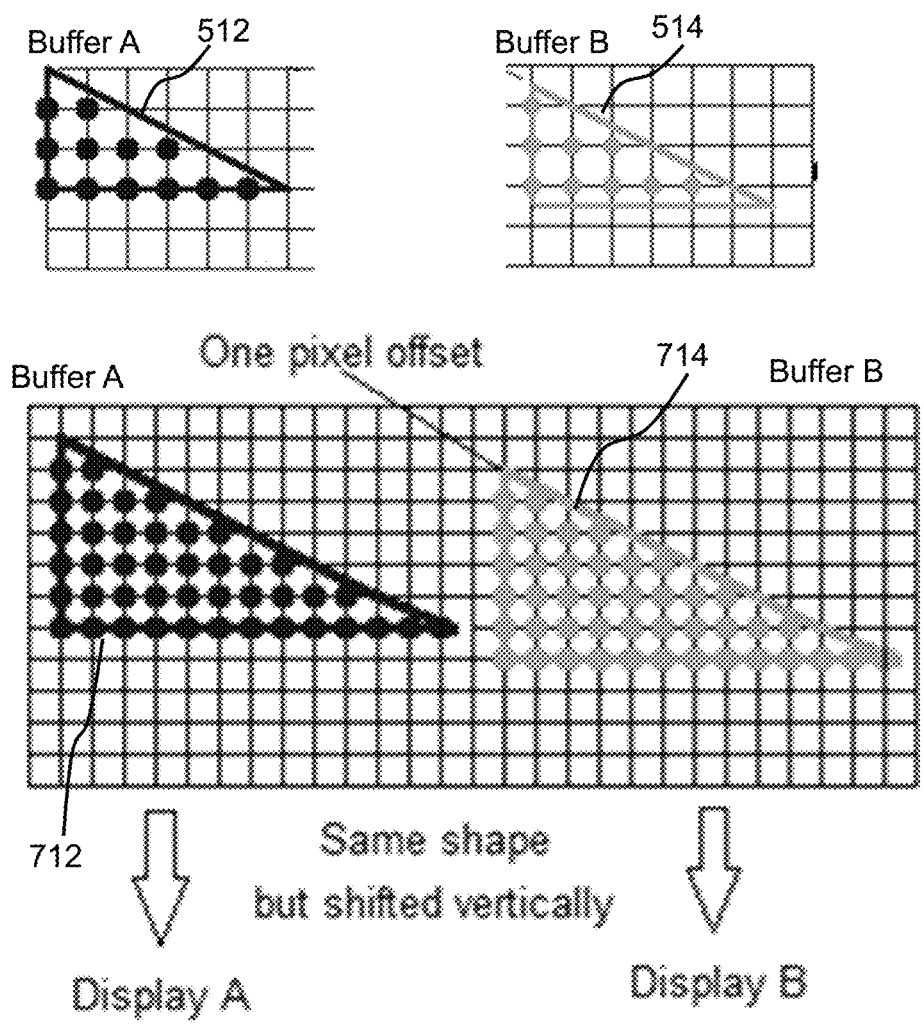
FIG. 7 shows a simplified block diagram of an exemplary representation of pixels of a polygon of an even image and odd image from an interlaced signal that are each upconverted to at least full resolution separate polygons, in accordance with some embodiments.

FIG. 7 shows a simplified block diagram of an exemplary representation of pixels of a polygon 512 (in this example a triangle) of an even image and corresponding pixels of the polygon 514 of an odd image from an interlaced signal, and that are each upconverted to at least full resolution separate polygons 712 and 714, respectively, in accordance with some embodiments. Each of the upconverted polygons can then be sequentially displayed as part of separate frames. Again, when performing the upconversion some embodiments compensate for the half pixel shift difference between the pixels of the source even image 512 and the source odd image 514, which in some implementations becomes one pixel shift, with images in both buffers being complete images. For example, in some instances both resulting upconverted images are substantially identical images in each buffer. Further, the vertical or Y shift, in some embodiments, is dependent on the uprendering matrix or mode. For example, in some implementations when a 1×2 uprendering matrix is applied a single pixel offset is achieved to compensate for the missing row of pixels (which may be considered a native resolution), while when using a 2×4 uprendering matrix some embodiments may provide additional pixels with an effective two pixels shift from the source image, or applying a 4×8 uprending matrix would provide a 4 pixel shift. In some embodiments, the uprendering matrix is selected to achieve the desired pixel shift (e.g., 2-pixel shift with a 2×4 uprendering matrix) allowing the XY/UV values to more closely mimic that of the original source content and/or rendering of the original source content through a legacy, lower resolution display device.

Similarly, a 2×2 uprendering matrix with upconversion is can be applied in some implementations, in which case the X-axis (e.g., horizontal) dimension would have 2× resolution compared to the original source image, while the Y-axis (e.g., vertical) would have upconverted native resolution. The application of a 2×2 uprendering matrix in upconversion may be beneficial in many instances, such as depending on a display device being used. Further, a 4×4 uprendering matrix could provide 4-times uprender along the X-axis and 2-times uprender plus an upconversion along the Y-axis. Still other such uprendering matrices can similarly be applied to achieve a desired resolution for the resulting upconverted images.

As described above, some embodiments do not have to perform a deinterlacing. Instead, some embodiments generate distinct full resolution (or uprendered resolution) images defined from each of the interlaced source even and odd images, and then display the upconversion image in a first buffer (e.g., buffer A), then sequentially display the upconversion image from a second buffer (e.g., buffer B), which may have a vertical shift. In some implementations, this approach provides 60 Hz refresh rate (i.e., two frames for each 30 Hz frame of both even and odd images), while typically achieving better image quality (e.g., because blending is not necessary).

As described above, however, some present embodiments providing upconversion allow interlaced multimedia content to be converted to full progressive-scan resolution with a full resolution image generated for each of the source even image and the source odd image. The upconversion typically further eliminates a need to apply approximations techniques, blending of images or fields, blurring the pixels and/or image and/or applying other such approximation techniques. Moreover, the full resolution progressive scan signal result is configured to be presented to the user at typically double the frame rate as the source content. For example, when the source content provides frames a 30 Hz (i.e., a pair of even and odd images displayed at a rate of 30 Hz), the upconverted progressive scan signal provides a full 60 Hz rate of motion, with a full pixel shift of the image is generated, avoiding the half pixel overlap (as a result of the inherent half pixel shift of the source odd image relative to the source even image).

Still further, in some embodiments the upconversion can implement an uprendering so that the resulting image of the full progressive scan output signal is at a resolution greater than a combination of the source even and odd images. For example, by applying an uprendering matrix of 2×4 to each of the source even images and source odd images of an interlaced signal that have a resolution of [640×224], resulting upconversion and uprendered images can be defined with resolutions of [1280×896].

For example, in accordance with some embodiments, an uprendering matrix can be a 2×4 matrix that defines through the upconversion and/or uprendering process eight pixels for each pixel of the source even reference image in defining a first upconverted image, and similarly defines eight pixels for each pixel of the source odd reference image in defining a second upconverted image. In upconverting an interlaced source even image having a resolution of [640×224], a reference image (RI) is generated consistent with the source even image, having the [640×224] resolution, and seven shifted images are defined, also with [640×224] resolution where the pixels in each of the shifted images are shifted, typically by a multiple of half a pixel. For example, the amount of shift for each of the reference image and the seven shifted images may be as follows when applying a 2×4 uprendering matrix when applied to a source even image:

RI: (x=0.0 y=0.0) SI1: (x=0.5 y=0.0)
SI2: (x=0.0 y=0.5) SI3: (x=0.5 y=0.5)
SI4: (x=0.0 y=1.0) SI5: (x=0.5 y=1.0)
SI6: (x=0.0 y=1.5) SI7: (x=0.5 y=1.5).

The resulting reference image (RI) and corresponding seven shifted images (SI1-SI7) are coalesced to define a resulting upconverted first image or frame having a resolution that is greater than the resolution of the source even image, and in this example provides a resolution of [1280×896] (i.e., incorporating eight pixels for each pixel of the source even image in a 2×4 grouping 222).

As described above, in many embodiments, the pixels of the odd source image have already been defined with a pixel shift, and typically a half pixel shift in the vertical direction (i.e., the Y direction). Accordingly, in defining the reference image and corresponding shifted images, each pixel is further shifted the negative half pixel vertically. In this example, the amount of shift for each of the reference image and the seven shifted images defined from a source odd image may be as follows when applying a 2×4 uprendering matrix:

RI: (x=0.0 y=−0.5) SI1: (x=0.5 y=−0.5)
SI2: (x=0.0 y=0.0) SI3: (x=0.5 y=0.0)
SI4: (x=0.0 y=0.5) SI5: (x=0.5 y=0.5)
SI6: (x=0.0 y=1.0) SI7: (x=0.5 y=1.0).

Again, the resulting reference image (RI) and corresponding seven shifted images (SI1-SI7) are coalesced to define a resulting upconverted second image or frame having a resolution that is greater than the resolution of the source odd image, and in this example while applying the 2×4 uprendering matrix providing a [1280×896] resolution. The half-pixel Y-shift applied by the interlaced source odd field is re-aligned in the resulting full image allowing subsequent uprendered higher resolution progressive scan images to be sequentially displayed while avoiding misalignment between sequential images.

The uprendering and/or upconversion generates resulting frames that increase the frame rate and/or the resolution of the resulting frames or images of the signal. Further, in some embodiments, the uprendered and/or upconverted image has a resolution that is at least double along at least the vertical axis than a resolution along the vertical axis of the interlaced source image. In some embodiments, the upconversion and/or uprendering allows a full progressive-scan signal to be defined from legacy interlaced images to be generated at full progressive scan and higher resolution with separate images being generated for each of the even and odd images. This can further eliminate, at least in some embodiments, a need to blend fields or blur the images. Moreover, the full-resolution or higher resolution progressive scan signal can be presented to a viewer at, for example, a full 60 Hz rate of motion (for a 30 Hz interlaced source signal). Additionally, in some embodiments, a full pixel shift of the image can be generated to avoid a half-pixel overlap, and/or half-pixel Y-shift applied by the legacy application to odd images is re-aligned.

Figures 8, 9:
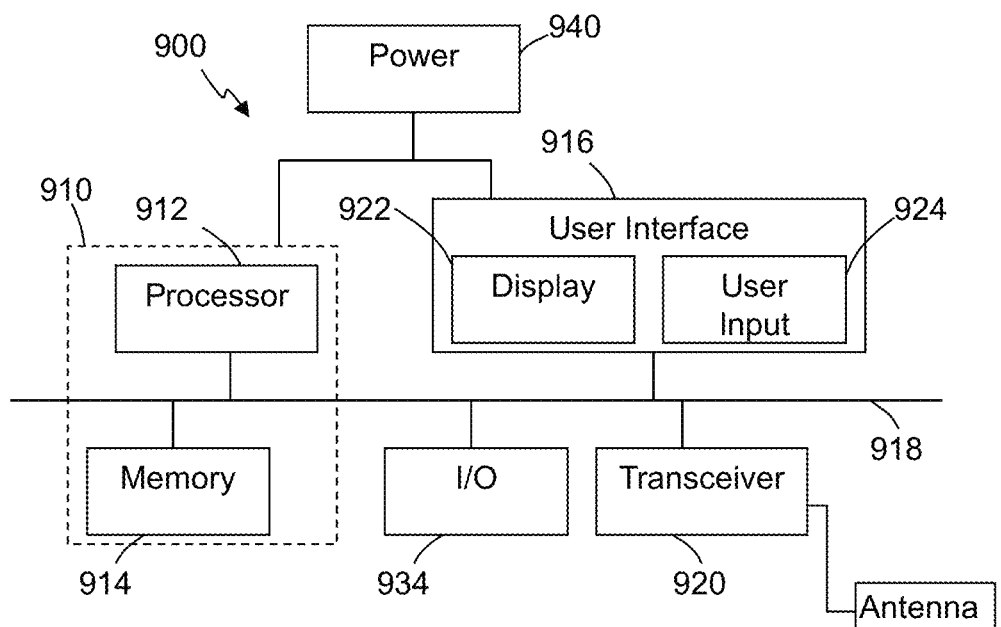
FIG. 8 shows a simplified representation of a matrix illustration of an upconversion transformation with respect to the Y and V coordinates.
FIG. 9 illustrates a system for use in implementing methods, techniques, devices, apparatuses, systems, servers, sources and the like in providing user interactive virtual environments in accordance with some embodiments.

FIG. 8 shows a simplified representation of a matrix illustration of an upconversion transformation with respect to the Y and V coordinates for the example above applying the 2×4 uprendering matrix.

The methods, techniques, systems, devices, services, sources and the like described herein may be utilized, implemented and/or run on many different types of devices and/or systems. Referring to FIG. 9, there is illustrated a system 900 that may be used for any such implementations, in accordance with some embodiments. One or more components of the system 900 may be used for implementing any system, apparatus or device mentioned above or below, or parts of such systems, apparatuses or devices, such as for example any of the above or below mentioned televisions, electronic gaming systems, laptops, tablets, smartphones, display system, content source, image processing system, emulator, uprendering system, upconverting system, and the like. However, the use of the system 900 or any portion thereof is certainly not required.

By way of example, the system 900 may comprise a controller or processor module 912, memory 914, and one or more communication links, paths, buses or the like 918. Some embodiments include a user interface 916. Further, a power source or supply 940 is included or coupled with the system 900. The controller 912 can be implemented through one or more processors, microprocessors, central processing unit, logic, local digital storage, firmware and/or other control hardware and/or software, and may be used to execute or assist in executing the steps of the processes, methods and techniques described herein, and control decoding, emulation, image processing, pixel processing, programs, content, listings, services, interfaces, etc. Further, in some embodiments, the controller 912 can be part of a control system 910 and/or implemented through one or more processors with access to one or more memory 914. The user interface 916 can allow a user to interact with the system 900 and receive information through the system. In some instances, the user interface 916 includes a display 922 and/or one or more user inputs 924, such as a remote control, keyboard, mouse, track ball, game controller, buttons, touch screen, etc., which can be part of or wired or wirelessly coupled with the system 900.

Typically, the system 900 further includes one or more communication interfaces, ports, transceivers 920 and the like allowing the system 900 to communication over a communication bus, a distributed network, a local network, the Internet, communication link 918, other networks or communication channels with other devices and/or other such communications or combinations thereof. Further the transceiver 920 can be configured for wired, wireless, optical, fiber optical cable or other such communication configurations or combinations of such communications.

The system 900 comprises an example of a control and/or processor-based system with the controller 912. Again, the controller 912 can be implemented through one or more processors, controllers, central processing units, logic, software and the like. Further, in some implementations the controller 912 may provide multiprocessor functionality.

The memory 914, which can be accessed by the controller 912, typically includes one or more processor readable and/or computer readable media accessed by at least the controller 912, and can include volatile and/or nonvolatile media, such as RAM, ROM, EEPROM, flash memory and/or other memory technology. Further, the memory 914 is shown as internal to the system 910; however, the memory 914 can be internal, external or a combination of internal and external memory. Similarly, some or all of the memory 914 can be internal, external or a combination of internal and external memory of the controller 912. The external memory can be substantially any relevant memory such as, but not limited to, one or more of flash memory secure digital (SD) card, universal serial bus (USB) stick or drive, other memory cards, hard drive and other such memory or combinations of such memory. The memory 914 can store code, software, executables, scripts, data, content, multimedia content, programming, programs, media stream, media files, textual content, identifiers, log or history data, user information and the like.

One or more of the embodiments, methods, processes, approaches, and/or techniques described above or below may be implemented in one or more computer programs executable by a processor-based system. By way of example, such a processor based system may comprise the processor based system 900, a computer, an electronic gaming console, a set-to-box, a television, an emulator, uprender, upconverter, an IP enabled television, a Blu-ray player, an IP enabled Blu-ray player, a DVD player, entertainment system, graphics workstation, tablet, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for uprendering, upconverting, generating a progressive scan signal, and the like. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: identifying an uprendering matrix, wherein the uprendering matrix is dependent on a resulting resolution of resulting multimedia content having the increased resolution; and for each image of the multimedia content: defining a reference image of the image from the multimedia content, wherein the reference image has a resolution that is the same as an original resolution of the image from the multimedia content; defining multiple shifted images of the image from the multimedia content, wherein each of the multiple shifted images corresponds with one of the elements of the uprendering matrix, and wherein each pixel in each of the multiple shifted images is shifted proportional to the element in the uprendering matrix with which the shifted image corresponds; and coalescing pixels from each of the reference image and the shifted images creating an uprendered image having a higher resolution than the reference image.

Other embodiments provide one or more computer-readable storage mediums storing one or more computer programs configured for use with a computer simulation, the one or more computer programs configured to cause a computer and/or processor based system to execute steps comprising: accessing an interlaced signal comprising pairs of source even and odd images, with each source even image and each source odd image specifying a matrix of pixels; for each pair of source even and odd images: defining, for the source even image, a reference even image having a resolution that is the same as the resolution of the source even image and at least one shifted even image with each pixel of the at least one shifted even image being shifted relative to a position of a corresponding pixel of the reference even image; coalescing the even reference image and the at least one shifted even image defining an upconverted first image having a resolution greater than the resolution of the even image; defining, for the source odd image, a reference odd image having a resolution that is the same as the resolution of the source odd image and at least one shifted odd image with each pixel of the shifted odd image being shifted relative to a position of a corresponding pixel of the reference odd image; coalescing the odd reference image and the at least one shifted odd image defining an upconverted second image having a resolution greater than the resolution of the odd image; and defining a progressive scan signal configured to sequentially playback the upconverted first image and the upconverted second image defined from each pair of the source even image and the source odd image.

Accordingly, some embodiments define and/or produce higher resolution images and/or provide progressive scan images. The uprendering and/or upconversion can be applied to substantially any relevant image, frame or the like. For example, electronic games from previous generations of gaming systems were typically designed for much lower display resolution (e.g., consistent with CRT televisions) than contemporary electronic games. The low resolution can make the game less enjoyable to play. Further, this problem of low resolution is often accentuated when using modern displays, for example, because of the much higher resolution available and/or size, and because many legacy games were configured to be displayed through interlaced scan images. Some embodiments, however, provide uprendering to provide increased resolution images, and/or can provide upconversion to provide a progressive scan signal. Again, some embodiments define or generate multiple copies of each image based on parameterized sub-pixel offsets. The series of reference and shifted images are then coalesced into a single higher resolution image.

For example, a reference image may be generated (which in some instances may be precisely that of the original source image that would be produced through legacy application hardware). In some embodiments, the reference image is defined or generated using per-pixel rendering techniques matching those of legacy hardware (e.g., bypassing a fixed-function rendering pipeline of discreet or embedded GPU). The shifted images are defined of the same image with sub-pixel adjustments in X/Y and/or UN sampling. Adjustments are selected based on the goal of providing a higher resolution image and/or filling in the data provided and displayed by current hi-resolution devices, and which was missing from the original low-resolution legacy hardware.

In some embodiments, the defining of the reference image and the one or more shifted images includes applying texture sampling for each pixel of the reference image as well as each pixel for the shifted images in accordance with the pixel shift defined for each shifted image. As is common in many rendering techniques, texture sampling is defined and implemented to obtain relevant texture date used in defining the pixel illumination and coloring. Further, in many embodiments the texture sampling is defined in accordance with one or more polygon meshes. As such, the pixel shifting implemented in defining the shifted images may result in pixels defined beyond one or more boundaries of a corresponding polygon. According, in some embodiments, implement a texture boundary check on at least those pixels corresponding to polygon boundaries, and often preforms a boundary check for every pixel shifted in each of the shifted images.

Furthermore, composite uprender may be used in some embodiments to upconvert the frame rate. For example, the upconversion can increase the frame rate from 30 Hz interlaced field-scans into native 60 Hz progressive scans, yielding a significant improvement in visual quality and user experience. Accordingly, some embodiments provide higher perceived refresh rates (e.g., true 60Hz) and/or higher perceived image or frame resolution.

Some embodiments provide apparatuses comprising: a control circuit; and a memory coupled to the control circuit and storing computer instructions that when executed by the control circuit perform the follows steps: access an interlaced signal comprising pairs of source even and odd images, with each source even image and each source odd image specifying a matrix of pixels; and for each pair of source even and odd images: define, for the source even image, a reference even image having a resolution that is the same as the resolution of the source even image and at least one shifted even image with each pixel of the at least one shifted even image being shifted relative to a position of a corresponding pixel of the reference even image; coalesce the reference even image and the at least one shifted even image defining an upconverted first image having a resolution greater than the resolution of the source even image; define, for the source odd image, a reference odd image having a resolution that is the same as the resolution of the source odd image and at least one shifted odd image with each pixel of the shifted odd image being shifted relative to a position of a corresponding pixel of the reference odd image; and coalesce the reference odd image and the at least one shifted odd image defining an upconverted second image having a resolution greater than the resolution of the source odd image; and define a progressive scan signal configured to sequentially playback the upconverted first image and the upconverted second image defined from each pair of the source even and odd images.

It is noted that the above description provides examples with identified resolutions. These are merely examples and should not be construed to be the only resolutions with which the present embodiments can operate. Instead, the embodiments can provide enhanced resolution images from substantially any resolution source image, images, frames, or the like.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of increasing a resolution of multimedia content, the method comprising:
   identifying an uprendering matrix, wherein the uprendering matrix is dependent on a resulting resolution of resulting multimedia content having the increased resolution; and
   for each source image of the multimedia content:
     defining a reference image of the source image from the multimedia content, wherein the reference image has a resolution that is the same as an original resolution of the source image from the multimedia content;
     defining multiple shifted images of the source image from the multimedia content, wherein each of the multiple shifted images corresponds with one of the elements of the uprendering matrix, and wherein each pixel in each of the multiple shifted images is shifted proportional to the element in the uprendering matrix with which the shifted image corresponds; and
     coalescing pixels from each of the reference image and the shifted images creating an uprendered image having a higher resolution than the reference image.

2. The method of claim 1, wherein the multimedia content comprises pairs of source even images and source odd images configured to be interlaced, and wherein the defining the reference image comprises defining, for each source odd image, the corresponding reference image with each pixel shifted a negative half pixel relative to the source odd image.

3. The method of claim 1, further comprising:
   storing the first reference image in a first buffer;
   storing each of the multiple shifted images into one of multiple different buffers.

4. The method of claim 3, wherein the coalescing the pixels comprises grouping pixel data having a same pixel location from each of the first buffer corresponding to the reference image and the multiple different buffers corresponding to one of the shifted images.

5. The method of claim 1, wherein the defining the multiple shifted images comprises shifting each pixel in each of the multiple shifted images by a multiple of half a pixel.

6. The method of claim 1, further comprising:
   texture sampling for each pixel in each of the reference image and the multiple shifted images;
   identifying, in each of the multiple shifted images, those pixels extending beyond a corresponding texture boundary as a result of the shifting of the pixels; and
   clamping, for each of the identified shifted pixels extending beyond the corresponding texture boundary, a texture sample to the texture boundary corresponding to the shifted pixel.

7. The method of claim 6, wherein the coalescing the pixels comprises grouping pixels, from each of the reference image and the shifted images, having the same pixel location.

8. The method of claim 7, wherein the grouping the pixels comprises grouping the pixels in accordance with the uprendering matrix.

9. The method of claim 1, wherein the defining the multiple shifted images comprises defining the multiple shifted images such that each of the multiple shifted images has a resolution that is the same as the original resolution of the source image.

10. The method of claim 1, wherein the defining the reference image comprises defining for every other field of the source images of the multimedia content the reference image such that each pixel in every other reference image is shifted a negative half pixel.

11. A method of generating a progressive scan signal of multimedia content, the method comprising:
accessing an interlaced signal comprising pairs of source even and odd images, with each source even image and each source odd image specifying a matrix of pixels;
for each pair of source even and odd images:
defining, for the source even image, a reference even image having a resolution that is the same as the resolution of the source even image and at least one shifted even image with each pixel of the at least one shifted even image being shifted relative to a position of a corresponding pixel of the reference even image;
coalescing the reference even image and the at least one shifted even image defining an upconverted first image having a resolution greater than the resolution of the source even image;
defining, for the source odd image, a reference odd image having a resolution that is the same as the resolution of the source odd image and at least one shifted odd image with each pixel of the shifted odd image being shifted relative to a position of a corresponding pixel of the reference odd image; and
coalescing the reference odd image and the at least one shifted odd image defining an upconverted second image having a resolution greater than the resolution of the source odd image; and
defining a progressive scan signal configured to sequentially playback the upconverted first image and the upconverted second image defined from each pair of the source even and odd images.

12. The method of claim 11, wherein the generating the progressive scan signal comprises preventing the coalescing of the reference odd image with the reference even image.

13. The method claim 11, wherein the defining the reference odd image comprises defining the reference odd image such that each pixel is shifted a negative half pixel relative to a position of a corresponding pixel in the source odd image.

14. The method of claim 13, wherein the defining the at least one shifted odd image comprises defining a first shifted odd image with each pixel of the first shifted odd image being shifted by a positive half pixel relative to the position of the corresponding pixel in the source odd image.

15. The method of claim 11, wherein the defining the at least one shifted even image comprises defining a first shifted even image with each pixel of the first shifted even image being shifted by a pixel relative to a position of a corresponding pixel in the source even image.

16. The method of claim 15, wherein the coalescing the reference even image and the at least one shifted even image comprises defining the upconverted first image such that the upconverted first image has a resolution that is at least double along at least a first axis than a resolution along the first axis of the source even image.

17. An apparatus comprising:
a control circuit; and
a memory coupled to the control circuit and storing computer instructions that when executed by the control circuit perform the follows steps:
identify an uprendering matrix, wherein the uprendering matrix is dependent on a resulting resolution of resulting multimedia content having the increased resolution; and
for each source image of the multimedia content:
define a reference image of the source image from the multimedia content, wherein the reference image has a resolution that is the same as an original resolution of the source image from the multimedia content;
define multiple shifted images of the source image from the multimedia content, wherein each of the multiple shifted images corresponds with one of the elements of the uprendering matrix, and wherein each pixel in each of the multiple shifted images is shifted proportional to the element in the uprendering matrix with which the shifted image corresponds; and
coalesce pixels from each of the reference image and the shifted images creating an uprendered image having a higher resolution than the reference image.

* * * * *